L. LANDRY
STAGGERED DISPERSING DEVICE FOR COLOR PROJECTION.
APPLICATION FILED MAR. 5, 1914.
1,189,266.
Patented July 4, 1916.
2 SHEETS—SHEET 1.
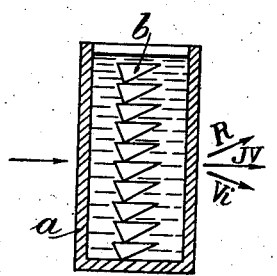
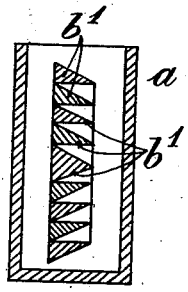
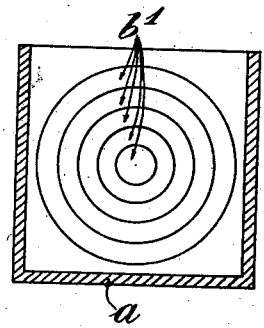
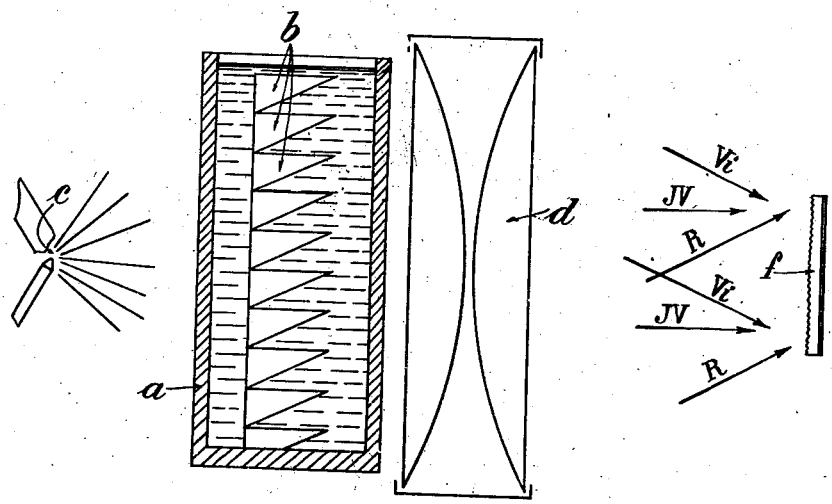

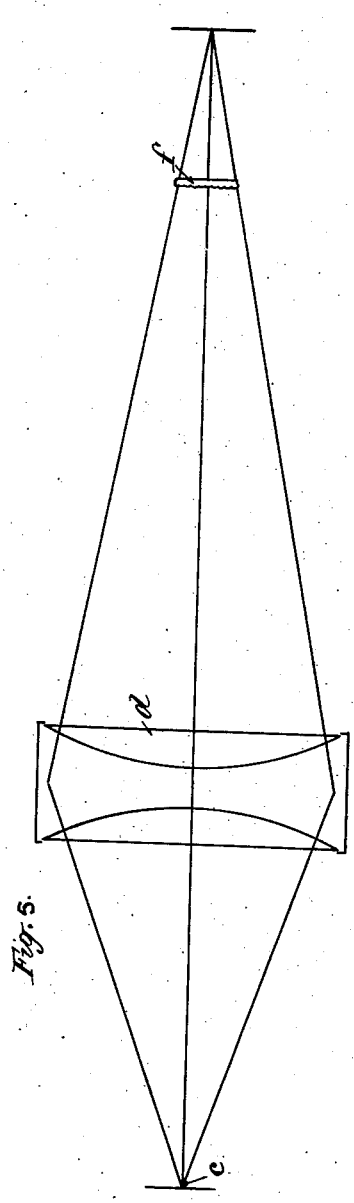
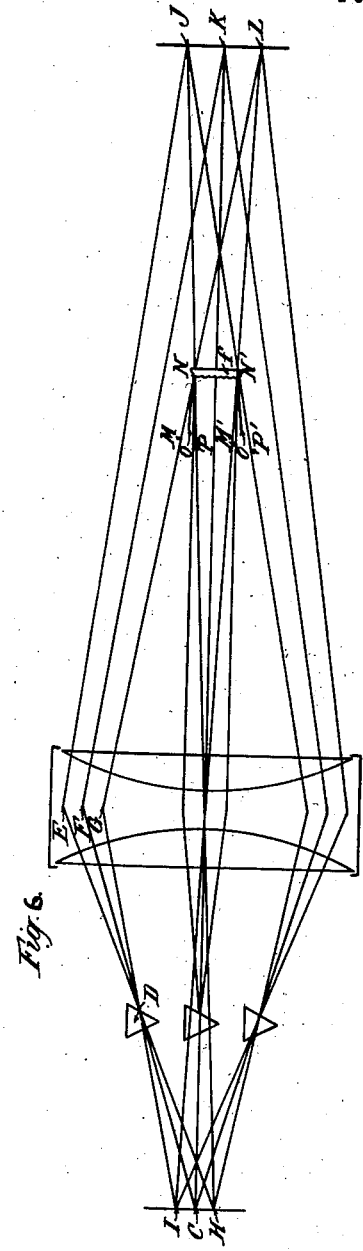

UNITED STATES PATENT OFFICE.

LOUIS LANDRY, OF PARIS, FRANCE, ASSIGNOR TO COMPAGNIE GÉNÉRALE DES ETABLISSEMENTS PATHÉ FRÈRES, PHONOGRAPHE ET CINÉMATOGRAPHE, OF PARIS, FRANCE.

STAGGERED DISPERSING DEVICE FOR COLOR PROJECTION.

1,189,266.   Specification of Letters Patent.   Patented July 4, 1916.

Application filed March 5, 1914. Serial No. 822,582.

*To all whom it may concern:*

Be it known that I, LOUIS LANDRY, citizen of the Republic of France, residing at 4 Rue Fabre d'Eglantine, Paris, in the Republic of France, have invented new and useful Improvements in Staggered Dispersing Devices for Color Projection, of which the following is a specification.

It has already been proposed in order to obtain monochrome pictures of an object, to photograph the latter by using prisms for decomposing the light emanating from the object and separating the rays of different colors from one another, these prisms being made to replace the colored screens used hitherto.

The present invention relates to a device based on the same principle of the decomposition of light by means of prisms, so as to avoid the loss of light when using colored screens, and particularly allows of producing a colored projection of colorless images of a special known kind, the said images being carried by a crimped support forming a refracting microscopic grating. These images must be lighted up for projection, as is known, in such a manner that the red rays impinge against the image in one direction, the green rays in another direction and the violet rays in the third direction. This result is obtained according to the invention by inserting in the beam of white light used for projection a device comprising a transparent vat, in which a prism or a lens with echelons is arranged and which contains a liquid, the average index of which is near that of the prism or lens, but that has a very high dispersing power.

In the accompanying drawing shown by way of an example only; Figure 1 is a cross section of the dispersing vat with echelons or staggered dispersing device according to the invention, the said vat being suitable for replacing screens with colored rectilinear stripes. Fig. 2 is a diagram of an apparatus for color projection comprising the dispersing vat of Fig. 1; Figs. 3 and 4 are a cross section and a front elevation of a vat intended to replace the annular concentric screens. Figs. 5 and 6 are diagrammatic views, illustrating the operation of my invention.

The device shown in Fig. 1 comprises a vat $a$ of any kind of glass with parallel front and rear walls, in which a number of prismatic bars $b$ of crown glass are assembled, that have a small dispersion and really form a prism with echelons. The vat $a$ contains a liquid for instance ethyl cinnamate, the mean index of refraction of which is near that of the prismatic bars, but that has a very high dispersing power. Under these conditions, the middle rays J V that have the same coefficient of refraction in both mediums pass through without being deviated, while the red rays R that are less refrangible in the liquid than in the glass, are deviated toward the top of the figure and the violet rays are deviated to the bottom for the reverse reason. The effect of such a vat on the beam of the projection apparatus for lighting up will be readily understood whether the latter be arranged in front or behind the condenser. According to the diagram shown in Fig. 2 the vat $a$ is inserted between the source of light $c$ and the condenser $d$. Each of the prismatic bars $b$ decomposes the white light it receives from the source $c$ according to the colors of the spectrum and the green and yellow rays finally meet the reticulated film $f$ carrying the image to be projected, according to the general direction J V, that is perpendicular to the image, while the violet rays meet the same according to the direction V$i$ that is inclined from the top to the bottom and the red lines according to the direction R that is inclined from the bottom to the top. The picture or film will really be lighted up in the same way as if three screens had been placed on the condenser, of which screens a red or orange colored screen would mask the lower part of the condenser, the green screen the middle zone and the violet screen would mask the upper part, but with this advantage that the amount of light used for the projection is much greater than in the case of colored screens. By judiciously choosing the glass of the prisms, the angle of incidence and of refraction of the rays, as well as the liquid that fills up the vat, the exact shades of color supplied by definitely colored screens can be reproduced.

Figs. 3 and 4 show the device intended to replace annular concentric screens. The prisms then assume the shape of staggered lenses $b^1$. They are cut out according to the shape of rings with conical generating lines and fit into one another. In order for instance to replace a trichrome screen comprising a central red disk, an intermediate green ring and an outer violet ring, a glass is taken the index of refraction of which for red light is equal to that of the liquid of the vat; the red beam will then proceed without deviation, the violet will be deviated toward the outside and the green will assume an intermediate position. In Fig. 5 of the drawing, $c$ is the source of light, $d$ the condenser and $f$ the reticulated or embossed film. Should no dispersing and refracting device be used, the white rays emanating from $c$ would be caught by the condenser $d$ and a conical beam of white rays would be projected through the film $f$ into the objective (not shown) and from the latter onto the projection screen. Then the refracting vat containing the prisms $b$ is interposed. Each white ray such as C D is decomposed into the various rays of the spectrum which may be assumed to be divided into three groups; the rays of the red group; those of the green group and those of the violet group. Said groups are shown diagrammatically by three lines D E, D F, and D G. The same is true of the various prisms such as D and assuming that the rays pass through a diaphragm which gives to the beam a conical shape, the condenser $d$ finally receives decomposed light in which the red rays or rays of the red group form approximately a conical beam the apex of which would be at a point such as H, the green rays, a cone having its apex at C and the rays of the violet group, a cone having its apex at I, the three points H, C, I, occupying various positions according to the existing conditions but having always relative positions approximately similar to those indicated on the drawing. The three cones of monochromatic rays are superposed for their greater part but the respective directions of said rays differ from one cone to the other so that the condenser $d$ projects said rays in the form of three different cones J K L. If the film $f$ is now placed in a position such as that shown, it will be seen that every lens of the film receives the three kinds of rays under three different incidences so that it can properly do its work and send said rays back to the image in the sensitized layer in the proper respective directions M N, M′ N′; O N, O′ N′ and P N, P′ N′ denote, for instance, the respective directions of the violet, green and red rays at two marginal points N and $N^1$ of the image.

The device of this invention can be applied whenever the image to be projected has been obtained by means of a colored selection produced in the order of the colors of the spectrum i. e. whenever the incidence of the colored rays on the reticulated film varies continually by passing from red to violet through yellowish-green.

Having now described my invention what I claim as new and desire to secure by Letters Patent is:

1. A device intended for decomposing light by separating the rays of different colors from one another by means of prisms which comprises a transparent vat, a staggered refracting body in said vat and a liquid in the vat, the average index of which is near that of the refracting body, but that has a very high dispersing power.

2. A projection apparatus comprising in combination a source of light, a condenser, a transparent vat, a staggered refracting body in said vat, and a liquid in the vat, the average index of which is near that of the refracting body but having a very high dispersing power.

In testimony whereof I have signed my name to this specification in the presence of two subscribing witnesses.

LOUIS LANDRY.

Witnesses:
 ANTOINE LAVOIS,
 HANSON C. COXE.